(12) United States Patent
Schlegel et al.

(10) Patent No.: US 10,125,883 B2
(45) Date of Patent: Nov. 13, 2018

(54) METHODS AND APPARATUS TO COUPLE MANIFOLD BLOCKS TO FORM A MANIFOLD

(71) Applicant: TESCOM CORPORATION, Elk River, MN (US)

(72) Inventors: John Leonard Schlegel, Rogers, MN (US); Todd William Larsen, Milaca, MN (US); William John Neubauer, Ramsey, MN (US); Robert Kenneth Miller, Big Lake, MN (US)

(73) Assignee: TESCOM CORPORATION, Elk River, MN (US)

( * ) Notice: Subject to any disclaimer, the term of this patent is extended or adjusted under 35 U.S.C. 154(b) by 0 days.

(21) Appl. No.: 15/157,087

(22) Filed: May 17, 2016

(65) Prior Publication Data

US 2017/0335989 A1 Nov. 23, 2017

(51) Int. Cl.
*F16K 27/00* (2006.01)
*F16B 3/00* (2006.01)
*F15B 13/08* (2006.01)

(52) U.S. Cl.
CPC ........ *F16K 27/003* (2013.01); *F15B 13/0803* (2013.01); *F16B 3/00* (2013.01)

(58) Field of Classification Search
CPC ...... F16K 27/003; F16B 3/00; F15B 13/0807; F15B 13/0803; Y10T 137/5109; Y10T 137/5283; Y10T 137/87885; Y10T 137/9029; Y10T 403/55; Y10T 403/553

USPC ............... 137/269, 271, 884, 798; 285/124.5
See application file for complete search history.

(56) References Cited

U.S. PATENT DOCUMENTS

| | | | | |
|---|---|---|---|---|
| 4,027,692 | A * | 6/1977 | Bouteille | F15C 5/00 137/269 |
| 4,082,324 | A * | 4/1978 | Obrecht | F15B 13/0814 137/271 |
| 4,535,821 | A * | 8/1985 | Anderson | B01F 5/0413 137/884 |
| 7,484,770 | B2 * | 2/2009 | Hamada | F16L 41/03 285/124.5 |
| 8,840,333 | B2 * | 9/2014 | Massey | E06B 1/04 40/782 |
| 2002/0121249 | A1 * | 9/2002 | Porter | B01F 3/022 122/31.1 |
| 2003/0047225 | A1 * | 3/2003 | Chuh | F15B 13/0817 137/884 |
| 2004/0074545 | A1 * | 4/2004 | Rodrigues | F16K 27/003 137/883 |

* cited by examiner

*Primary Examiner* — Michael R Reid
(74) *Attorney, Agent, or Firm* — Hanley, Flight & Zimmerman, LLC

(57) ABSTRACT

Methods and apparatus to couple manifold blocks to form a manifold are disclosed. An example apparatus includes a first manifold block including a first fluid passageway defining a first opening in a first surface of the first manifold block. The example apparatus includes a first keyway extending along the first surface of the first manifold block. The example apparatus includes a first key to be inserted in the first keyway and a second keyway of a second manifold block to couple the first manifold block to the second manifold block to fluidly couple the first fluid passageway to a second fluid passageway of the second manifold block.

23 Claims, 8 Drawing Sheets

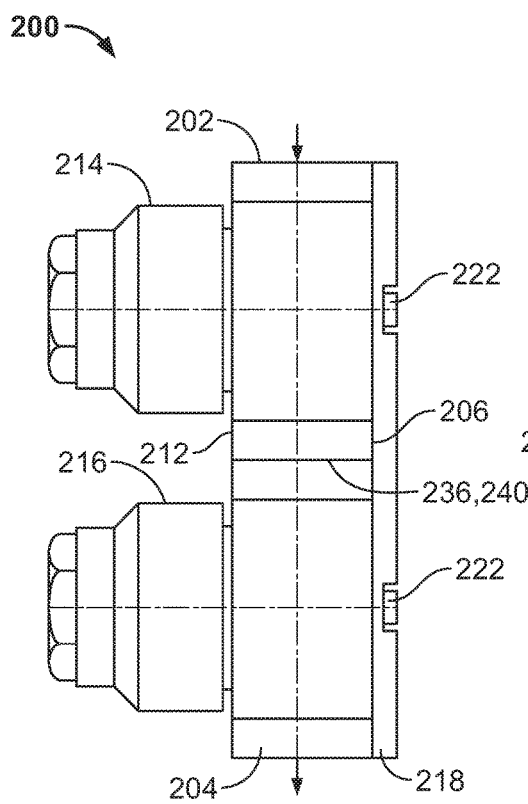
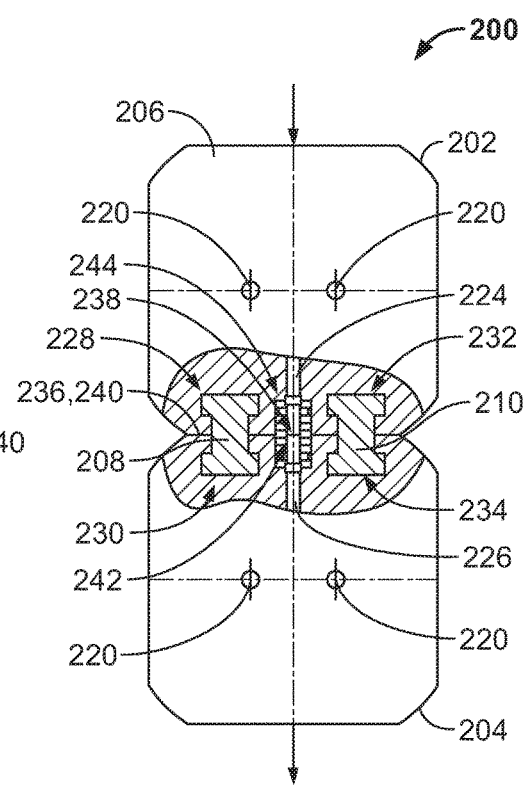
FIG. 2A
FIG. 2B

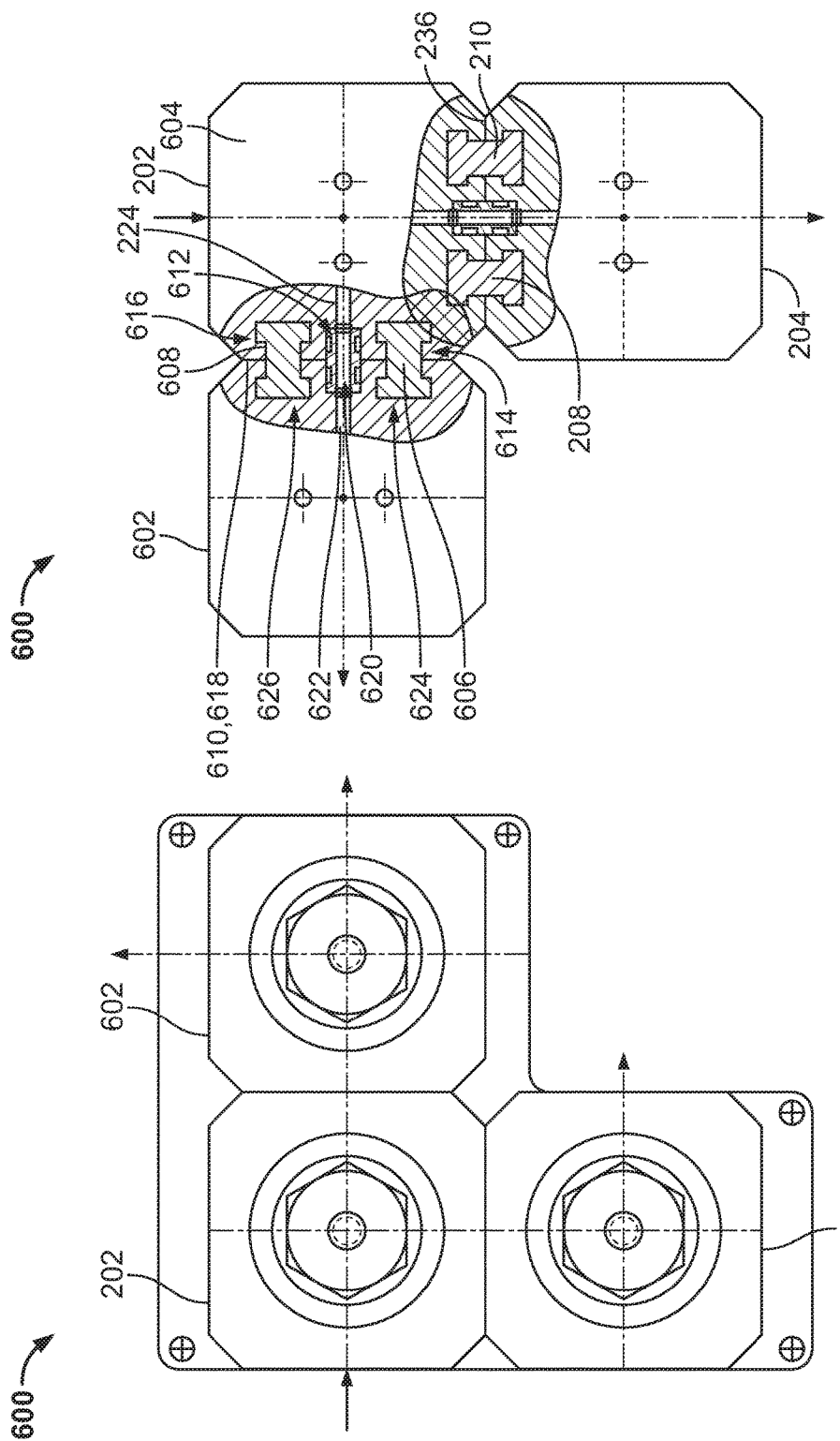

METHODS AND APPARATUS TO COUPLE MANIFOLD BLOCKS TO FORM A MANIFOLD

FIELD OF THE DISCLOSURE

This patent relates generally to manifolds and, more particularly, to methods and apparatus to couple manifold blocks to form a manifold.

BACKGROUND

Fluid flow devices (e.g., fluid valves) oftentimes are used in process control systems to control fluid flow. A process control system may include a plurality of fluid valves to control a plurality of fluid flow pathways. For example, the plurality of fluid valves control the flow of fluid for one or more components (e.g., actuators) of the process control system. In some instances, the process control system includes a manifold that enables a source of fluid to be fluidly coupled to the plurality of fluid valves in a compact, organized manner. For example, the manifold forms a block of fluid passageways each of which fluidly couples the fluid source of the manifold to a respective one of the fluid valves of the process control system.

SUMMARY

In one example, an apparatus includes a first manifold block including a first fluid passageway defining a first opening in a first surface of the first manifold block. The apparatus includes a first keyway extending along the first surface of the first manifold block. The apparatus includes a first key to be inserted in the first keyway and a second keyway of a second manifold block to couple the first manifold block to the second manifold block to fluidly couple the first fluid passageway to a second fluid passageway of the second manifold block.

In another example, an apparatus includes a first manifold block including a first fluid passageway that defines a first opening in a first surface of the first manifold block and a first keyway that extends along the first surface. The apparatus includes a second manifold block including a second fluid passageway that defines a second opening in a second surface of the second manifold block and a second keyway that extends along the second surface. The apparatus includes a first key inserted in the first keyway and the second keyway to interlock with the first manifold block and the second manifold block to couple the first manifold block and the second manifold block. The first opening is adjacent the second opening when the first manifold block is coupled to the second manifold block to fluidly couple the first fluid passageway and the second fluid passageway.

In another example, an apparatus includes means for interlocking manifold blocks. The apparatus includes a first manifold block including a first opening of first fluid passageway and first means for receiving the means for interlocking. The first means for receiving extends along a first surface of the first manifold. The apparatus includes a second manifold block including a second opening of a second fluid passageway and second means for receiving the means for interlocking. The second means for receiving extends along a second surface of the first manifold. The means for interlocking is to be inserted in the first and second means for receiving to couple the first and second manifolds. The first opening is adjacent the second opening when the first and second manifold blocks are coupled to fluidly couple the first and second fluid passageways.

BRIEF DESCRIPTION OF THE DRAWINGS

FIG. 2A is a side view of a manifold of example manifold blocks in accordance with the teachings of this disclosure.

FIG. 2B is a partial cutaway view of a back side of the manifold blocks of FIG. 2A coupled together via example keys in accordance with the teachings of this disclosure.

FIG. 6A is a front view of another manifold of example manifold blocks in accordance with the teachings of this disclosure.

FIG. 6B is a partial cutaway view of a back side of the manifold blocks of FIG. 6A coupled together via example interlocking keys in accordance with the teachings of this disclosure.

The figures are not to scale. Instead, to clarify multiple layers and regions, the thicknesses of the layers may be enlarged in the drawings. Wherever possible, the same reference numbers will be used throughout the drawing(s) and accompanying written description to refer to the same or like parts.

DETAILED DESCRIPTION

Figure 1A:
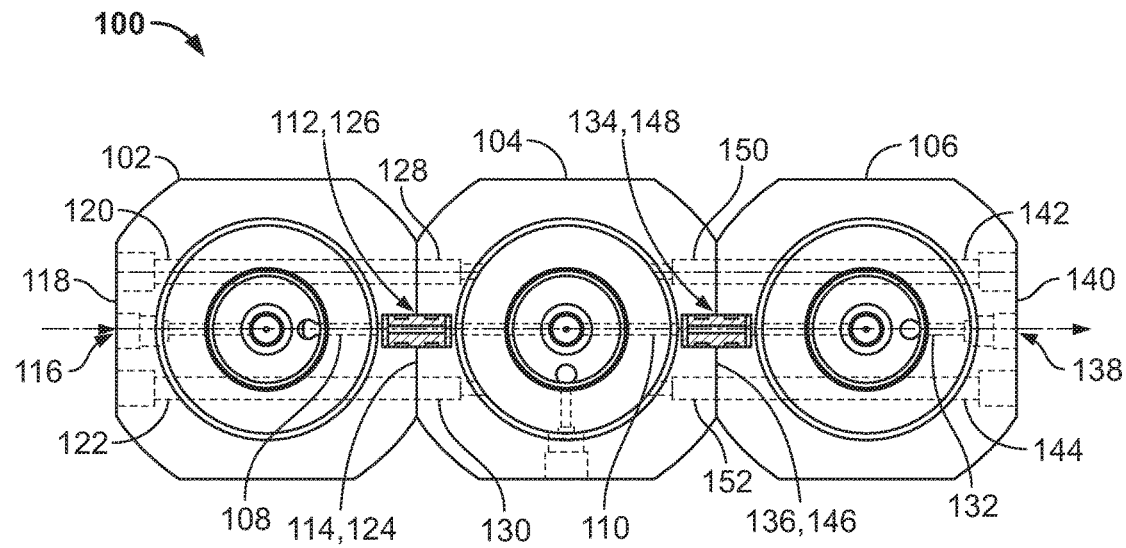
FIG. 1A shows an assembly of known manifold blocks.

Process control systems often employ fluid flow devices (e.g., fluid valves, pressure regulators, relief valves, solenoid valves, pressure transducers, etc.) to control fluid flow. For example, some process control systems include a plurality of fluid valves to control a plurality of fluid flows for corresponding components (e.g., actuators) of the process control system. In some examples, the fluid flow components and/or corresponding process control components are in fluid communication with a shared or common fluid source. For example, a first fluid flow device may control an amount and/or flow rate of fluid that flows to a first process control component from a fluid source, and a second fluid flow device may control an amount and/or flow rate of fluid that flows to a second process control component from the same fluid source. In some examples, the first fluid flow device is fluidly coupled to the fluid source via a first conduit (e.g., first piping or tubing) and fluidly coupled to the corresponding first process control component via a second conduit (e.g., second piping or tubing). Further, the second fluid flow device is fluidly coupled to the fluid source via a third conduit (e.g., third piping or tubing) and fluidly coupled to the corresponding second process control component via a fourth conduit (e.g., fourth piping or tubing). The separate piping and/or tubing of such process control systems may become tangled, unorganized and/or otherwise difficult to manage in confined spaces.

To reduce an amount of space utilized by a plurality of fluid flow devices and/or process control components, some known process control systems include a manifold that fluidly couples the fluid source to each of the plurality of fluid flow devices and/or process control components. Known manifolds may include a plurality of fluid passageways that conjoin with a fluid path in fluid communication with the fluid source. For example, a single conduit may couple to the manifold to fluidly couple the fluid source to each of the fluid passageways and, thus, each of the corresponding fluid flow devices. As a result, the manifold reduces an amount of external piping or tubing needed to fluidly couple a fluid source to a plurality of fluid flow devices.

Some known manifolds further reduce and/or consolidate installation space by coupling the fluid flow devices to a surface of the manifold. For example, the manifold may include a plurality of manifold blocks that are coupled together. Each of the manifold blocks includes a fluid flow device (e.g., a fluid valve) and a corresponding fluid passageway defined by a body of the manifold block that fluidly couples the fluid flow device to the fluid source.

In some known examples, the manifold blocks of the manifold are coupled together via bolts and threaded apertures of the manifold blocks. To enable a plurality of manifold blocks to be coupled together while preventing the threaded apertures from intersecting the fluid passageways of the manifold blocks, the threaded apertures may be staggered. The bolts and staggered threaded apertures may be difficult to assemble, thereby increasing installation time and/or costs. Further, a manifold block having staggered threaded apertures may be custom manufactured so that its staggered apertures align with staggered apertures of adjacent manifold blocks, thereby increasing manufacturing time and/or costs. Further, it may not be possible to replace custom manufactured manifold blocks with modular, off-the-rack manifold blocks, thereby increasing inventory costs.

The example apparatus and methods disclosed herein include modular and/or interchangeable manifold blocks that are coupled together via easily accessible keys and keyways, thereby reducing manufacturing time and/or costs, installation time and/or costs, and/or inventory costs. An example manifold disclosed herein includes a first manifold block having a first fluid passageway that defines a first opening in a first surface of the first manifold block and a first keyway that extends along the first surface. The manifold also includes a second manifold block having a second fluid passageway that defines a second opening in a second surface of the second manifold block and a second keyway that extends along the second surface. Further, the example manifold includes a first key that is to be inserted in the first keyway and the second keyway to interlock with the first and second manifold blocks to couple the first and second manifold blocks together. When the first and second manifold blocks are coupled together via the first key and the first and second keyways, the first opening is adjacent the second opening to fluidly couple the first fluid passageway of the first manifold block with the second fluid passageway of the second manifold block.

The keyways of the examples disclosed herein are spaced apart from the fluid passageways of the respective manifold blocks to prevent the keyways from interfering with the fluid flow of the fluid passageways. To prevent rusting and/or other damage resulting from the fluid flowing through the manifold, the manifold blocks and the key of the manifold may be composed of rust-resistant material such as stainless steel or brass. Further, to sealingly couple the first fluid passageway and the second fluid passageway, the examples disclosed herein include a fluid connector having a first portion that is inserted in and/or received by a first counterbore of the first opening and an opposing second portion that is inserted in and/or received by a second counterbore of the second opening. Additionally or alternatively, a fluid valve, a pressure regulator, a relief valve, a solenoid valve, a pressure transducer and/or any other fluid flow device may be coupled to each of the manifold blocks and in fluid communication with the fluid passageway of the corresponding manifold block.

To enable the first key to interlock with and couple the first manifold block and the second manifold block, the first key includes a first portion that is to be received by the first keyway and a second portion (e.g., symmetric relative to the first portion) that is to be received by the second keyway. For example, to prevent the first manifold block from separating from the second manifold block, the first key has an I-shaped cross-section and each of the corresponding first and second keyways has a T-shaped cross-section. In other examples, the first key has a tapered (e.g., bowtie-shaped) cross-section and each of the corresponding first and second keyways has a tapered (e.g., dovetailed) cross-section. That is, to prevent the first and second manifold blocks from separating from each other, the first keyway defines an opening in the first surface of the first manifold block having a width (e.g., a first width) that is less than a width (e.g., a second width) defined, in part, by an adjacent cavity of the first keyway to enable the first key to interlock with the first manifold block. Similarly, the second keyway defines an opening in the second surface of the second manifold block having a width (e.g., a third width) that is less than a width (e.g., a fourth width) defined, in part, by an adjacent cavity of the second keyway to enable the first key to interlock with the second manifold block.

In the examples disclosed herein, the first keyway extends from a back surface toward a front surface of the first manifold block, and the second keyway extends from a back surface toward a front surface of the second manifold block. The length of each of the keyways is less than the thicknesses of the respective manifold blocks such that the keyways do not extend to the front surfaces of the manifold blocks. Further, the example manifolds disclosed herein include a manifold plate that is to couple to a back surface of the first and second manifold blocks to enclose the first key in the first and second keyways.

In some examples, a third keyway extends along the first surface of the first manifold block and a fourth keyway extends along the second surface of the second manifold block. In such examples, the manifold includes a second key that is to be inserted in the third keyway and the fourth keyway to further couple the first manifold block and the second manifold block. Additionally or alternatively, the manifold includes a third manifold block having a third fluid passageway that defines a third opening in a third surface of the third manifold block and a fifth keyway that extends along the third surface. In such examples, the first manifold block includes a fourth surface (e.g., adjacent and/or opposite the first surface) that defines a fourth opening of the first fluid passageway and a sixth keyway. A third key of the manifold is to be inserted in the fifth and sixth keyways to couple the first and third manifold blocks to fluidly couple the first and third fluid passageways via the third and fourth openings. Further, the manifold may include a fourth manifold block having a fourth fluid passageway that defines a fifth opening in a fifth surface of the fourth manifold block and a seventh keyway that extends along the fifth surface. The first manifold block includes a sixth surface (e.g., adjacent and/or opposite the first and fourth surfaces) that defines a sixth opening of the first fluid passageway and an eighth keyway. A fourth key is to be inserted in the seventh and eighth keyways to couple the first and fourth manifold blocks to fluidly couple the first and fourth fluid passageways via the fifth and sixth openings.

Figure 1B:
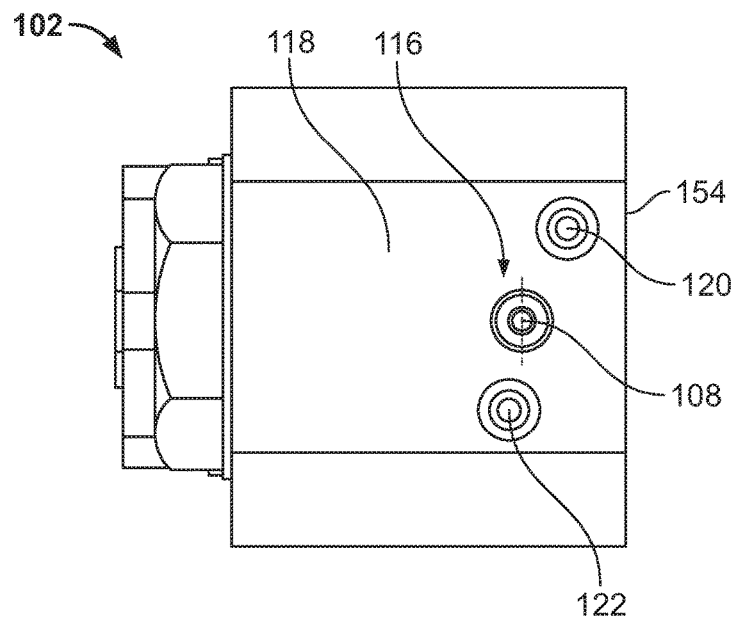
FIG. 1B is a side view of one of the known manifold blocks of FIG. 1A.

Before discussing the example manifold blocks and keys disclosed herein, a brief description of a known manifold 100 having known manifold blocks 102, 104, 106 is provided in FIGS. 1A and 1B. More specifically, FIG. 1A is a front view of the manifold 100, and FIG. 1B is a side view of the manifold block 102.

As illustrated in FIG. 1A, the manifold blocks 102, 104, 106 are coupled together to fluidly couple a fluid passageway 108 of the manifold block 102 to a fluid passageway 110 of the manifold block 104. The fluid passageway 108 defines an opening 112 on a first side 114 of the manifold block 102 and another opening 116 on an opposing second side 118 of the manifold block 102. The manifold block 102 also defines through holes 120, 122 that extend from the second side 118 to the first side 114. A first side 124 of the manifold block 104 defines an opening 126 of the fluid passageway 108 and blind holes 128, 130 (e.g., threaded blind holes) that align with the through holes 120, 122. To couple the manifold block 102 to the manifold block 104, respective fasteners (e.g., bolts) extend through the through holes 120, 122 and are received (e.g., threadably received) by the blind holes 128, 130.

Further, the manifold blocks 104, 106 are coupled together to fluidly couple the fluid passageway 110 of the manifold block 104 to a fluid passageway 132 of the manifold block 106. The fluid passageway 132 defines an opening 134 on a first side 136 of the manifold block 106 and another opening 138 on an opposing second side 140 of the manifold block 106. The manifold block 106 also defines through holes 142, 144 that extend from the second side 140 to the first side 136. A second side 146 of the manifold block 104 defines another opening 148 of the fluid passageway 108 and blind holes 150, 152 (e.g., threaded blind holes) that align with the through holes 142, 144 to enable respective fasteners to extend through the through holes 142, 144 and be received (e.g., threadably received) by the blind holes 150, 152.

As illustrated in FIG. 1A, the manifold block 104 includes different fastening holes (e.g., the blind holes 128, 130, 150, 152) than the fastening holes of the manifold blocks 102, 106 (e.g., the through holes 120, 122, 142, 144) to enable the manifold blocks 102, 104, 106 to be coupled together. The through holes 120, 122, 142, 144, the blind holes 128, 130, 150, 152, and the fluid passageways 108, 110, 132 of the known manifold 100 create a network of internal pathways. As illustrated in FIG. 2B, to prevent the through holes 120, 122 of the manifold block 102 from intersecting the fluid passageway 108 and, thus, compromising and/or otherwise negatively affecting the flow characteristics of the manifold 100, the through holes 120, 122 and the fluid passageway 108 are staggered. For example, the through hole 120 is closer to and the other through hole 122 is farther from a back side 154 relative the fluid passageway 108. Because of the different types and/or staggering of the fastening holes, the manifold blocks 102, 104, 106 are not interchangeable with each other. Thus, multiple replacement manifold blocks may be kept in inventory and/or replacement parts may be tailored via secondary manufacturing processes to replace one or more of the manifold blocks 102, 104, 106. Additionally or alternatively, forming (e.g., via high-precision drills) and/or aligning the staggered fastening holes of the manifold blocks 102, 104, 106 may increase installation and/or manufacturing time and/or costs. Further, if an additional manifold block is to be inserted between two of the manifold blocks 102, 104, 106, additional manufacturing costs and/or time may be spent modifying the additional manifold block and/or the two of the manifold blocks 102, 104, 106 to enable the additional manifold block to couple to the manifold blocks 102, 104, 106.

FIGS. 2A and 2B illustrate an example manifold 200 having example manifold blocks 202, 204 in accordance with the teachings disclosed herein. More specifically, FIG. 2A depicts a side view of the manifold 200, and FIG. 2B depicts a partial cutaway of a back side 206 of the manifold 200. The manifold 200 of the illustrated example includes the manifold block 202 (e.g., a first manifold block) and the manifold block 204 (e.g., a second manifold block) that are coupled together via an interlocking key 208 (e.g., a first key) and another interlocking key 210 (e.g., a second key).

As illustrated in FIG. 2A, each of the manifold blocks 202, 204 includes a front side 212 and the opposing back side 206. A fluid flow device 214 (e.g., a first fluid flow device) is coupled to the front side 212 of the manifold block 202, and another fluid flow device 216 (e.g., a second fluid flow device) is coupled to the front side 212 of the manifold block 204. In the illustrated example, the fluid flow devices 214, 216 are fluid valves. In other examples, the fluid flow device 214 and/or the fluid flow device 216 is a pressure regulator, a relief valve, a solenoid valve, a pressure transducer, etc. As illustrated in FIG. 2A, the manifold 200 includes a manifold plate 218 that couples to the back side 206 of the manifold blocks 202, 204. The back side 206 defines apertures 220 (e.g., threaded apertures) that receive respective fasteners 222 (e.g., threaded fasteners) to couple the manifold plate 218 to the back side 206 of the manifold blocks 202, 204.

The manifold block 202 includes a fluid passageway 224 (e.g., a first fluid passageway), and the manifold block 204 includes a fluid passageway 226 (e.g., a second fluid passageway). The manifold blocks 202, 204 are composed of, for example, stainless steel, brass and/or another rust resistant material to deter, reduce, and/or prevent the manifold blocks 202, 204 from rusting. In the illustrated example, the fluid passageway 224 is in fluid communication with the fluid flow device 214 that is coupled to the manifold block 202, and the fluid passageway 226 is in fluid communication with the fluid flow device 216 that is coupled to the manifold block 204. Further, when the manifold blocks 202, 204 of the manifold 200 are coupled together, the fluid passageway 224 is in fluid communication with the fluid passageway 226.

As illustrated in FIG. 2B, the manifold blocks 202, 204 are coupled together via the keys 208, 210 and corresponding keyways 228, 230, 232, 234. The manifold block 202 includes a surface 236 (e.g., a first surface) extending between the back side 206 and the front side 212 that defines an opening 238 (e.g., a first opening) of the fluid passageway 224 and the keyways 228, 232. When the manifold blocks 202, 204 are coupled together, the surface 236 of the manifold block 202 engages a surface 240 (e.g., a second surface) of the manifold block 204 that extends between the back and front sides 206, 212 of the manifold block 204 and defines an opening 242 (e.g., a second opening) of the fluid passageway 224 and the keyways 230, 234. As illustrated in FIG. 2B, the opening 238 is adjacent the opening 242 when the manifold blocks 202, 204 are coupled together to fluidly couple the fluid passageways 224, 226. Further, in the illustrated example, a fluid connector 244 sealingly couples the fluid passageway 224 and the fluid passageway 226.

To couple the manifold blocks 202, 204 together, the surface 236 of the manifold block 202 engages the surface 240 of the manifold block 204 such that the keyway 228 (e.g., a first keyway) aligns with the keyway 230 (e.g., a second keyway) and the keyway 232 (e.g., a third keyway) aligns with the keyway 234 (e.g., a fourth keyway). Further, the key 208 is inserted in the adjacent keyway 228, 230, and the key 210 is inserted in the other adjacent keyways 232, 234. The keys 208, 210 interlock with the manifold blocks 202, 204 to couple the manifold blocks 202, 204 together and, thus, form the manifold 200. The keys 208, 210 are composed of, for example, stainless steel, brass and/or another rust-resistant material to deter, reduce, and/or prevent the keys 208, 210 from rusting. In the illustrated example, the manifold 200 includes two keys (e.g., the keys 208, 210) and two sets of keyways (e.g., the keyways 228, 230 and the keyways 232, 234) to couple the manifold blocks 202, 204 together. In other examples, the manifold 200 may include more or less keys and corresponding keyways to couple the manifold blocks 202, 204 together.

As illustrated in FIG. 2A, the manifold block 202 is substantially similar or identical to the manifold block 204. For example, the keyways 228, 232 are identical to and/or symmetrical relative to the keyways 230, 234, and the fluid passageway 224 is identical to and/or symmetrical relative to the fluid passageway 226. Thus, the manifold blocks 202, 204 of the manifold 200 are modular and/or interchangeable, thereby reducing costs associated with inventory of replacement parts for the manifold 200. For example, the inventory of replacement parts may include one manifold block that is able to replace the manifold block 202 or the manifold block 204 without altering the replacement manifold block via secondary manufacturing processes.

Figure 3:
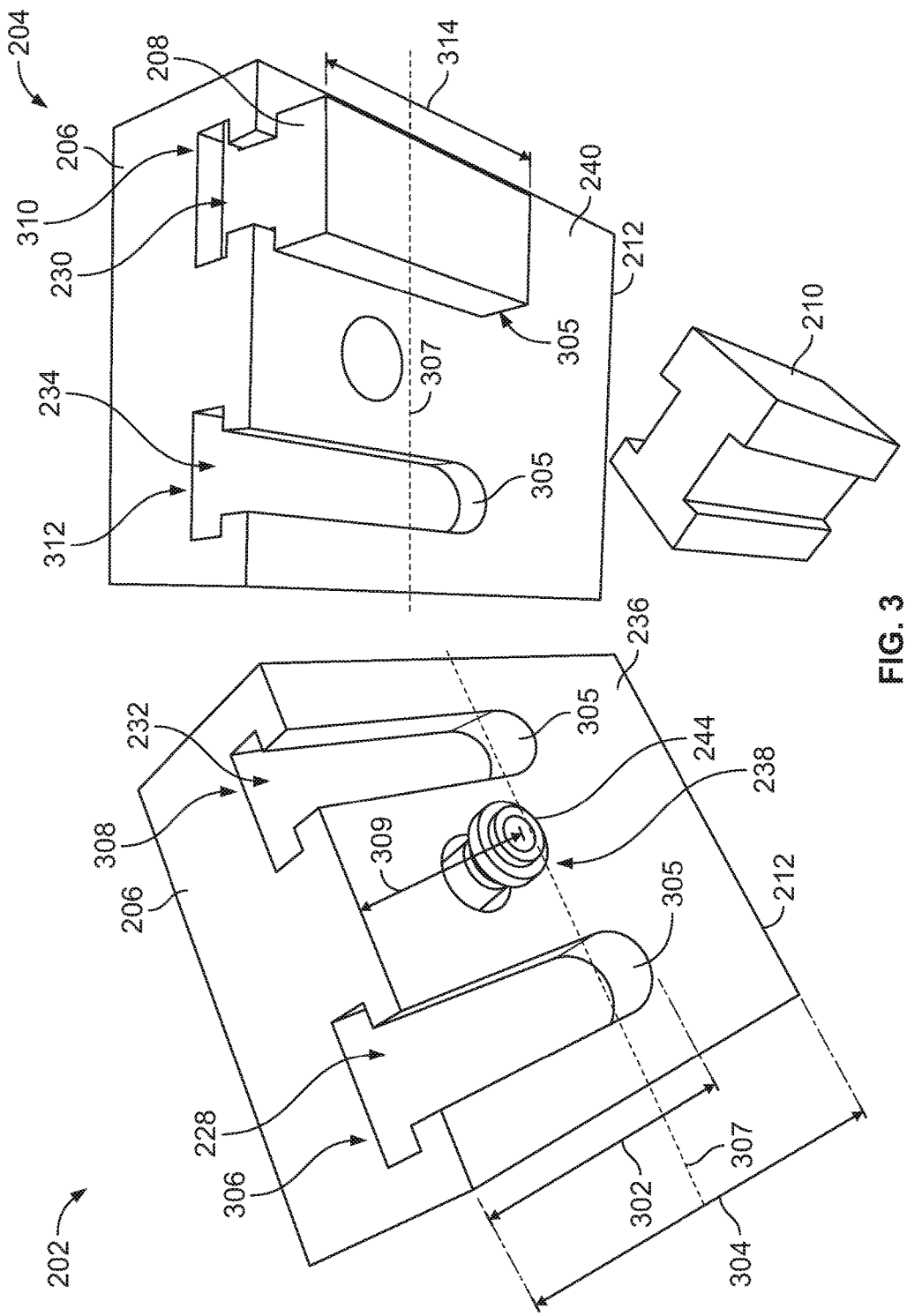
FIG. 3 is a perspective view of the keys of FIG. 2B and portions of the manifold blocks of FIGS. 2A-2B.

FIG. 3 is a perspective view of the example keys 208, 210 and respective portions of the manifold blocks 202, 204. More specifically, FIG. 3 illustrates the keys 208, 210, the back side 206 and the surface 236 of the manifold block 202, and the back side 206 and the surface 240 of the manifold block 204. The key 208 is partially disposed in the keyway 230, and the key 210 is decoupled from the manifold blocks 202, 204. Further, the fluid connector 244 is partially disposed in the opening 238 of the manifold block 202.

As illustrated in FIG. 3, the keyways 228, 232 extend from the back side 206 toward the front side 212 of the manifold block 202, and the keyways 230, 234 extend from the back side 206 toward the front side 212 of the manifold block 204. Each of the keyways 228, 232, has a length 302 (e.g., a first length) less than a thickness 304 (e.g., a first thickness) of the manifold block 202. The keyways 228, 230, 232, 234 extend the length 302 from the back side 206 of the manifold block 202, 204 to example stops 305. The example stops 305 are structured such that the keyways 228, 230, 232, 234 do not reach the front side 212 of the manifold block 202. In the illustrated example, the keys 208, 210 engage the stops 305 when the keys 208, 210 are received within the keyways 228, 230, 232, 234 to prevent the key 208, 210 from moving past the stops 305. Additionally, in the example of FIG. 3, the length 302 from the back side 206 of the manifold blocks 202, 204 to the stop 305 is longer than a length 309 from the back side 206 to the fluid connector 244. Further, in this example, the length 302 extends past a center line 307 of the manifold blocks 202, 204. Similarly, the length 302 of the keyways 230, 234 is less than the thickness 304 of the manifold block 204 such that the keyways 230, 234 do not reach the front side 212 of the manifold block 204.

In the illustrated example, the back side 206 of the manifold block 202 defines an opening 306 (e.g., a third opening) of the keyway 228 through which the key 208 is to be inserted and an opening 308 (e.g., a fourth opening) of the keyway 232 through which the key 210 is to be inserted. Further, the back side 206 of the manifold block defines an opening 310 (e.g., a fifth opening) of the keyway 230 through which the key 208 is to be inserted and an opening 312 (e.g., a sixth opening) through which the key 210 is to be inserted. The manifold plate 218 (FIG. 2A) is coupled to the back side 206 of the manifold blocks 202, 204 to retain the keys 208, 210 in the corresponding keyways 228, 230, 232, 234 and, thus, maintain the interlocked coupling of the manifold blocks 202, 204 via the keys 208, 210. For example, to enable the keys 208, 210 to be enclosed in the corresponding keyways 228, 230, 232, 234, the keys 208, 210 have a length 314 (e.g., a second length) that is less than the length 302 of the keyways 228, 230, 232, 234.

Figure 4:
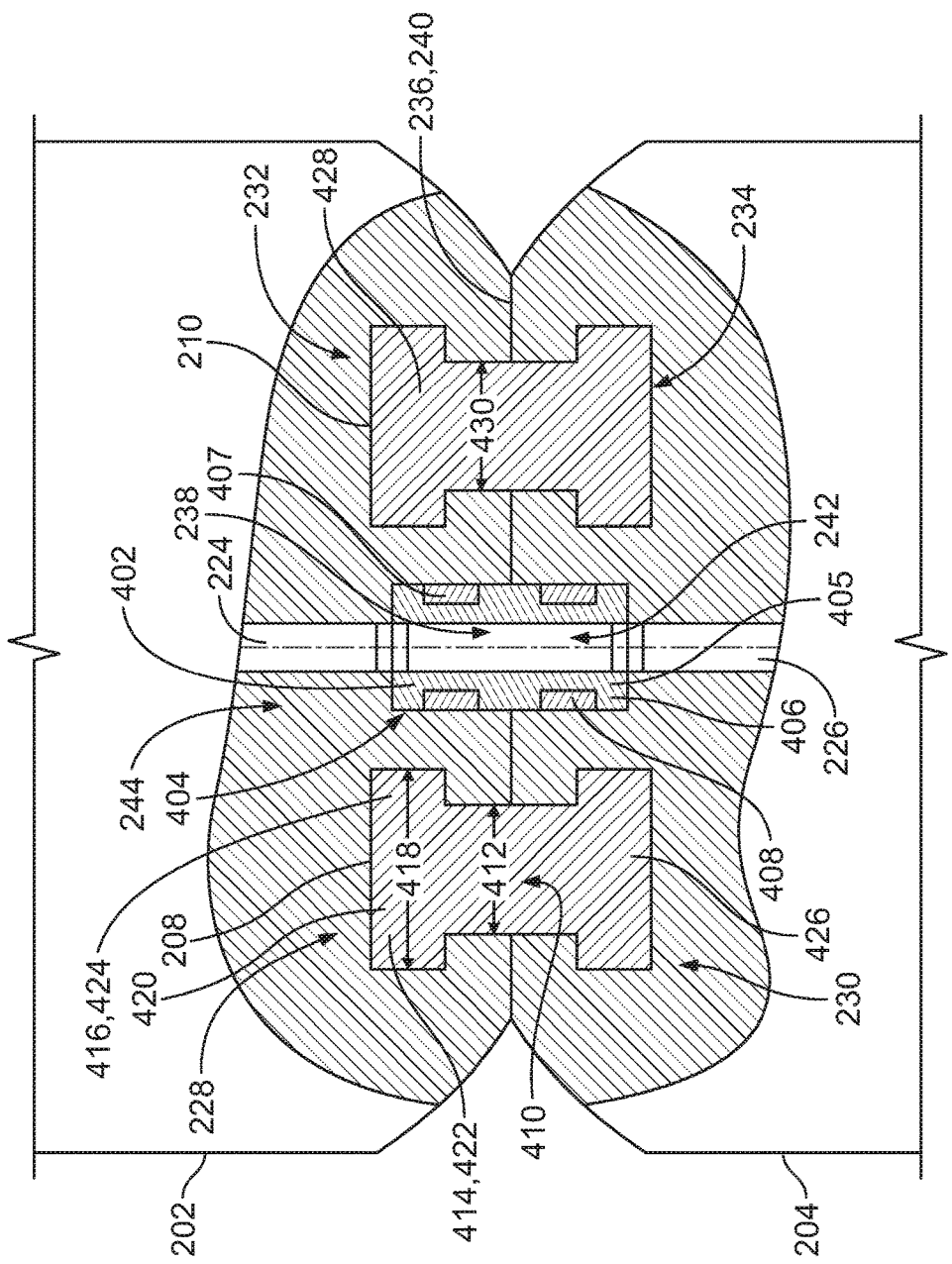
FIG. 4 is an enlarged view of the keys, the manifold blocks, and a fluid connector of FIG. 2B.

FIG. 4 is an enlarged, partial cutaway view of the fluid connector 244 and the interlocking T-shaped keys 208, 210 that couple the manifold blocks 202, 204 together. The fluid connector 244 of the illustrated example sealingly couples the fluid passageway 224 of the manifold block 202 to the fluid passageway 226 of the manifold block 204. For example, to sealingly couple the fluid passageways 224, 226, a first portion or end 402 of the fluid connector 244 is received by a counterbore 404 of the opening 238 of the fluid passageway 224, and an opposing second portion or end 405 is received by a counterbore 406 of the opening 242 of the fluid passageway 226. For example, the first portion 402 of the fluid connector 244 includes one or more seals 407 (e.g., a first o-ring seal, a first backup ring, etc.) that are received by the counterbore 404 to sealingly couple the fluid connector 244 and the fluid passageway 224, and the second portion 405 includes one or more seals 408 (e.g., a second o-ring seal, a second backup ring, etc.) that are received by the counterbore 406 to sealingly couple the fluid connector 244 and the fluid passageway 226.

The fluid passageways 224, 226 and the fluid connector 244 of the illustrated example are spaced apart from the keyways 228, 230, 232, 234. Thus, the keyways 228, 230, 232, 234 that enable the manifold blocks 202, 204 to couple together do not intersect, interfere with, compromise and/or otherwise negatively affect fluid flowing through the fluid passageways 224, 226. Further, because the keyways 228, 230, 232, 234 are positioned along the corresponding surfaces 236, 240 of the manifold blocks 202, 204, the keys 208, 210 and the keyways 228, 230, 232, 234 coupling the manifold blocks 202, 204 together reduce the risk of any other fluid passageways extending through the manifold blocks 202, 204 from being interfered with, compromised and/or otherwise negatively affected by the keyways 228, 230, 232, 234.

As illustrated in FIG. 4, the keyways 228, 230, 232, 234 and the corresponding keys 208, 210 have cross-sections that enable the keys 208, 210 to interlock with the manifold blocks 202, 204 when the keys 208, 210 are disposed in the keyways 228, 230, 232, 234 to enable the keys 208, 210 to couple the manifold blocks 202, 204 together. For example, to enable the key 208 to interlock with the manifold block 202, the keyway 228 defines an opening 410 (e.g., a seventh opening) in the surface 236 of the manifold block 202 having a first width 412. Cavities 414, 416 of the keyway 228 adjacent the opening 410 define, in part, a second width 418 that is greater than the first width 412. Further, as illustrated in FIG. 4, the keyway 228 receives a first portion 420 of the key 208. The cavities 414, 416 of the keyway 228 receive corresponding sections 422, 424 of the first portion 420 of the key 208 to enable the manifold 202 to interlock with the key 208 and, thus, prevent the key 208 from separating from the manifold block 202. In the illustrated example, the keyway 230 of the manifold block 204 is identical or substantially similar to the keyway 228 of the manifold block 204 and, thus, prevents a second portion 426 of the key 208 opposite the first portion 420 from separating from the manifold block 204. Further, the key 210 and the keyways 232, 234 are identical or substantially similar to the key 208 and the keyways 228, 230. Thus, the keyways 228, 230, 232, 234 enable the corresponding keys 208, 210 to interlock with the manifold blocks 202, 204 to couple the manifold blocks 202, 204 together. Further, in the illustrated example, a middle portion 428 of each of the keys 208, 210 (e.g., a middle portion of the I-shaped cross-section) has a thickness 430 that enables the keys 208, 210 to withstand a force and/or pressure exerted by the manifold block 202 and/or the manifold block 204 (e.g., resulting from fluid flowing through the fluid passageways 224, 226) to maintain the coupling between the manifold blocks 202, 204.

To enable the manifold blocks 202, 204 and/or the keys 208, 210 to be interchangeable and/or modular, the first portion 420 of each of the keys 208, 210 is symmetric relative to the opposing second portion 426, and the keyways 228, 232 are symmetric relative to the keyways 230, 234. In the illustrated example, the keys 208, 210 have substantially I-shaped cross-sections and the corresponding keyways 228, 230, 232, 234 have substantially T-shaped cross-sections to enable the keys 208, 210 to interlock the manifold blocks 202, 204 together. Alternatively, the keys 208, 210 may have substantially C-shaped cross-sections and the corresponding keyways 228, 230, 232, 234 have arced cross-sections. In other examples, the keys 208, 210 and the keyways 228, 230, 232, 234 have tapered cross-sections to interlock the manifold blocks 202, 204 together. For example, the keys 208, 210 may have bowtie-shaped cross-sections and the keyways 228, 230, 232, 234 may have dovetail-shaped cross-sections.

Figure 5A:
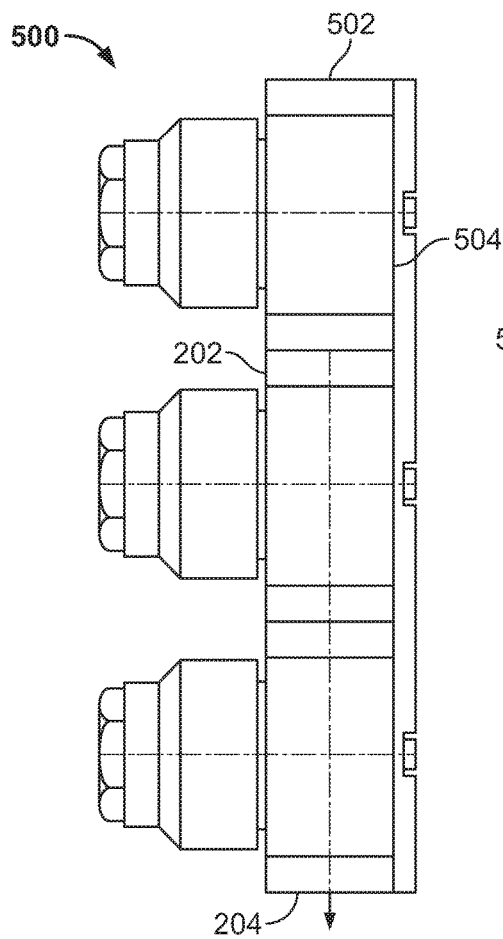
FIG. 5A is a side view of another manifold of example manifold blocks in accordance with the teachings of this disclosure.
Figure 5B:
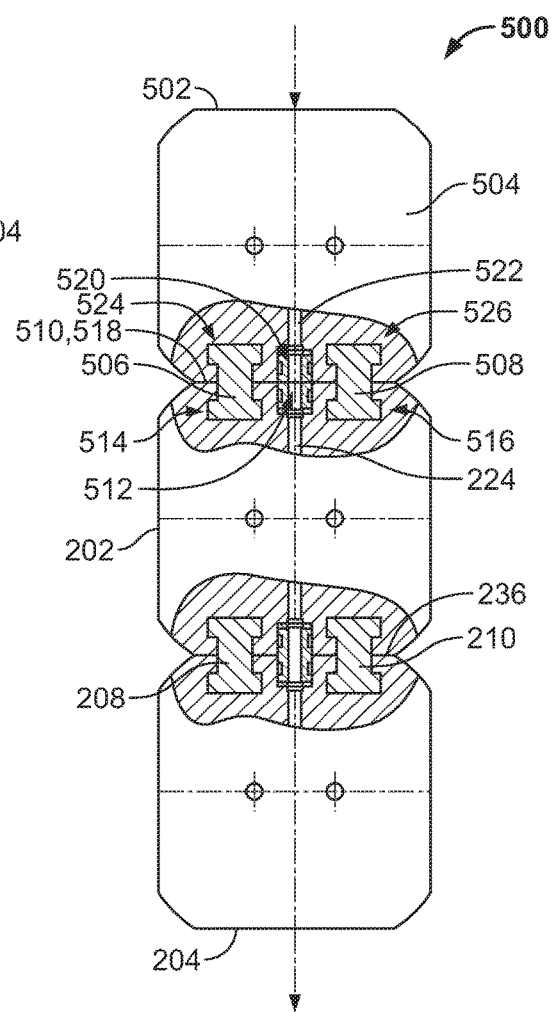
FIG. 5B is a partial cutaway view of a back side of the manifold blocks of FIG. 5A coupled together via example interlocking keys in accordance with the teachings of this disclosure.

FIGS. 5A and 5B illustrate another example manifold 500 having the example manifold blocks 202, 204 (e.g., the first and second manifold blocks) and another example manifold block 502 (e.g., a third manifold block) in accordance with the teachings disclosed herein. More specifically, FIG. 5A depicts a side view of the manifold 500, and FIG. 5B depicts a partial cutaway of a back side 504 of the manifold 500. In the illustrated example, the manifold blocks 202, 204 are coupled together via the keys 208, 210 (e.g., the first and second interlocking keys), and the manifold blocks 202, 502 are coupled together via keys 506, 508 (e.g., third and fourth keys). The keys 506, 508 of FIGS. 5A and 5B are substantially similar or identical to the keys 208, 210 of FIGS. 2A-5B and will not be described in further detail below.

In the illustrated example, the manifold block 202 includes a surface 510 (e.g., a third surface) opposite the surface 236. The surface 510 defines an opening 512 (e.g., an eighth opening) of the fluid passageway 224 and keyways 514, 516 (e.g., fifth and sixth keyways). Further, the manifold block 502 includes a surface 518 (e.g., a fourth surface) that engages the surface 510 when the manifold blocks 202, 502 are coupled together. The surface 518 defines an opening 520 (e.g., a ninth opening) of a fluid passageway 522 (e.g., a third fluid passageway) and keyways 524, 526 (e.g., seventh and eighth keyways). The keyways 514, 516, 524, 526 are substantially similar or identical to the keyways 228, 230, 232, 234 of FIGS. 2A-5B and will not be described in further detail below. Further, other characteristics of the manifold block 502 are substantially similar or identical to those of the manifold blocks 202, 204 and will not be described in further detail below.

As illustrated in FIG. 5B, the manifold blocks 202, 204, 502 and the keys 208, 210, 506, 508 are modular. The modularity of the keys 208, 210, 506, 508 enables the keys 208, 210, 506, 508 to be interchangeable, thereby reducing costs associated with inventory of replacement parts. Additionally or alternatively, the modularity of the manifold blocks 202, 204, 502 enables at least some of the manifold blocks 202, 204, 502 to be interchangeable, thereby further reducing costs associated with inventory of replacement parts. For example, a replacement manifold block that is identical or substantially similar to the manifold block 202 of FIGS. 5A and 5B may be utilized to replace any one of the manifold blocks 202, 204, 502. In some examples, the manifold block 204 may define two additional keyways opposite the keyways 230, 234 and the manifold block 502 may define two additional keyways opposite the keyways 524, 526 to further increase the modularity and/or interchangeability of the manifold blocks 202, 204, 502 of the manifold 500.

FIGS. 6A and 6B illustrate another example manifold 600 having the example manifold blocks 202, 204 (e.g., the first and second manifold blocks) and another example manifold block 602 (e.g., a fourth manifold block) in accordance with the teachings disclosed herein. More specifically, FIG. 6A depicts a front view of the manifold 600, and FIG. 6B depicts a partial cutaway of a back side 604 of the manifold 600. In the illustrated example, the manifold blocks 202, 204 are coupled together via the keys 208, 210 (e.g., the first and second interlocking keys), and the manifold blocks 202, 602 are coupled together via keys 606, 608 (e.g., fifth and sixth keys). The keys 606, 608 of FIGS. 6A and 6B are substantially similar or identical to the keys 208, 210 of FIGS. 2A-5B and will not be described in further detail below.

In the illustrated example, the manifold block 202 includes a surface 610 (e.g., a fifth surface) adjacent the surface 236. The surface 610 defines an opening 612 (e.g., tenth opening) of the fluid passageway 224 and keyways 614, 616 (e.g., ninth and tenth keyways). Further, the manifold block 602 includes a surface 618 (e.g., a sixth surface) that engages the surface 610 when the manifold blocks 202, 602 are coupled together. The surface 618 defines an opening 620 (e.g., an eleventh opening) of a fluid passageway 622 (e.g., a fourth fluid passageway) and keyways 624, 626 (e.g., eleventh and twelfth keyways). The keyways 614, 616, 624, 626 are substantially similar or identical to the keyways 228, 230, 232, 234 of FIGS. 2A-5B and will not be described in further detail below. Further, other characteristics of the manifold block 502 are substantially similar or identical to those of the manifold blocks 202, 204 and will not be described in further detail below.

The keys 208, 210, 606, 608 in the illustrated example are modular to enable the keys 208, 210, 606, 608 to be interchangeable to reduce costs associated with inventory of replacement parts. Additionally or alternatively, the manifold blocks 202, 204, 602 are modular to enable at least some of the manifold blocks 202, 204, 602 to be interchangeable to further reduce costs associated with inventory of replacement parts.

Figure 7:
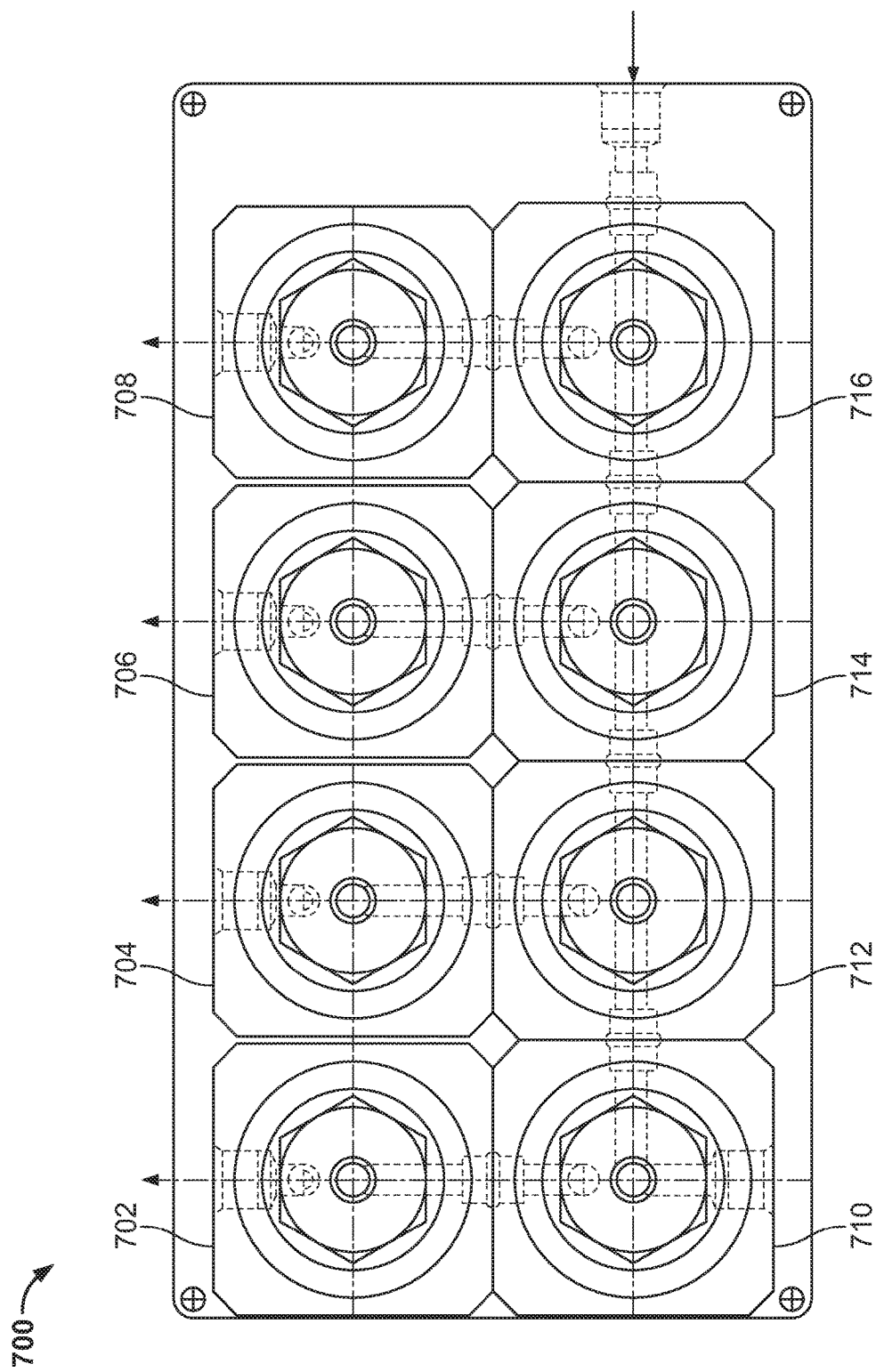
FIG. 7 illustrates another manifold of example manifold blocks in accordance with the teachings of this disclosure.

FIG. 7 illustrates another example manifold 700 having manifold blocks 702, 704, 706, 708, 710, 712, 714, 716 that are coupled together in accordance with the teachings herein. For example, the manifold blocks 702, 704, 706, 708, 710, 712, 714, 716 are coupled together via a series of keys and keyways that are substantially similar to the keys 208, 210 and the keyways 228, 230, 232, 234 described in FIGS. 2A-6B. Thus, those components will not be described in further detail below.

As illustrated in FIG. 7, the manifold block 702 is coupled to and in fluid communication with the manifold block 710, the manifold block 704 is coupled to and in fluid communication with the manifold block 712, the manifold block 706 is coupled to and in fluid communication with the manifold block 714, and the manifold block 708 is coupled to and in fluid communication with the manifold block 716. Further, the manifold block 712 is coupled to and in fluid communication with the manifold blocks 710, 714, and the manifold block 714 is coupled to and in fluid communication with the manifold block 716. For example, each of the manifold blocks 712, 714 is coupled to and in fluid communication with three other manifold blocks (e.g., the manifold blocks 704, 710, 714 and the manifold blocks 706, 712, 716, respectively) in accordance with the teachings herein. The modularity of the manifold blocks 702, 704, 706, 708, 710, 712, 714, 716 of the illustrated example enables at least some of the manifold blocks 702, 704, 706, 708, 710, 712, 714, 716 to be interchangeable, thereby reducing costs associated with inventory of replacement parts.

Figure 8:
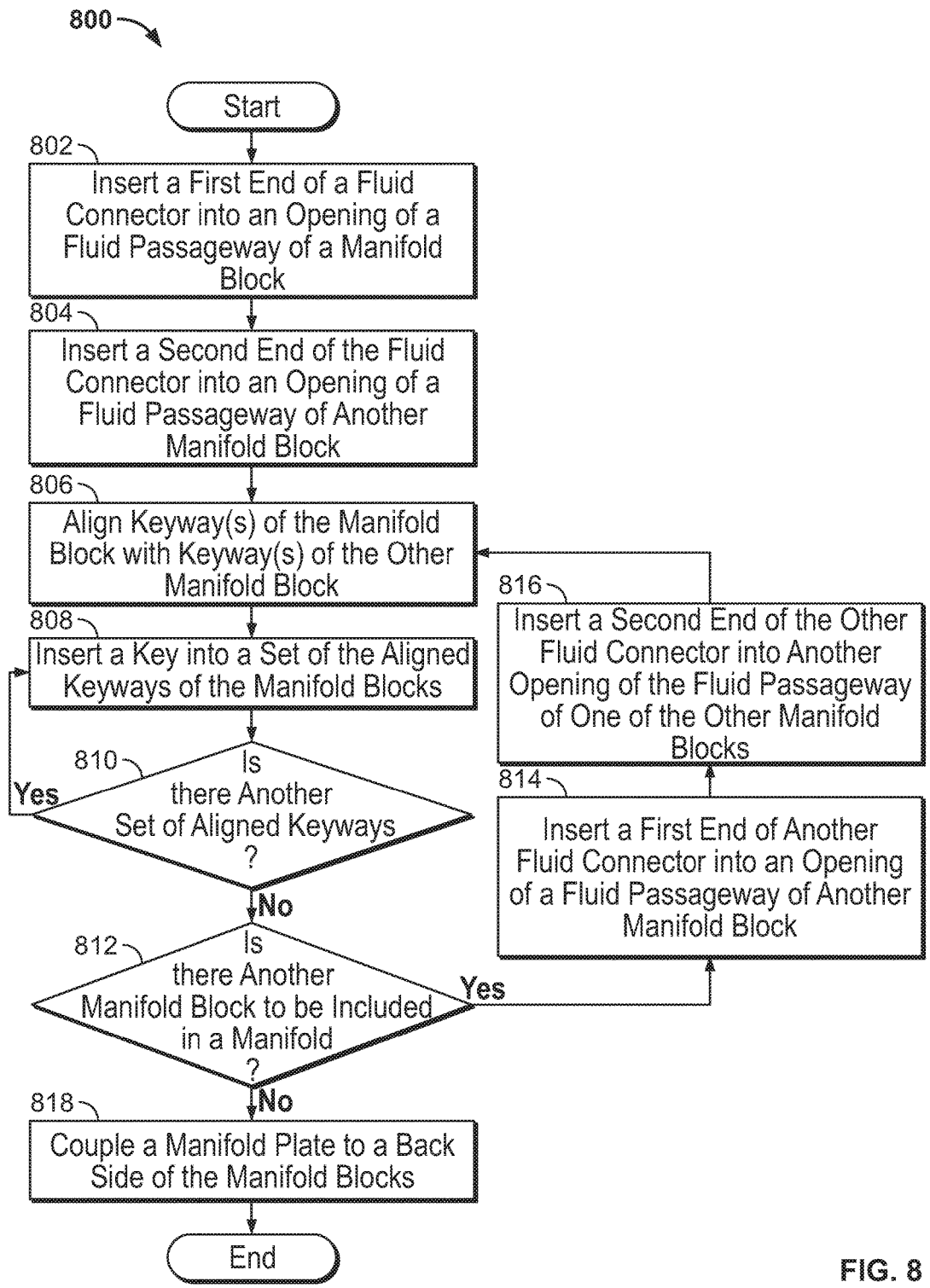
FIG. 8 is a flowchart representative of an example method to assemble a manifold of the example manifold blocks of FIGS. 2A-4, the example manifold blocks of FIGS. 5A-5B, the example manifold blocks of FIGS. 6A-6B and/or the example manifold blocks of FIG. 7 in accordance with the teachings herein.

FIG. 8 is a flowchart representative of an example method 800 to assemble an example manifold in accordance with the teachings herein. Although the example method 800 is described with reference to the flowchart illustrated in FIG. 9, many other methods of assembling the manifold may alternatively be used. For example, the order of execution of the blocks may be changed, and/or some of the blocks described changed, eliminated, and/or combined.

The method 800 for assembling a manifold is discussed in connection with the manifold 200 of FIGS. 2A-4B, the manifold 500 of FIGS. 5A-5B, the manifold 600 of FIGS. 6A-6B and/or the manifold 700 of FIG. 7. Further, because the method 800 may refer to the manifold 200 of FIGS. 2A-4B, the manifold 500 of FIGS. 5A-5B, the manifold 600 of FIGS. 6A-6B and/or the manifold 700 of FIG. 7, components identified in FIGS. 2A-7 having functions substantially similar or identical to the functions of components described below will not be described in detail again. Instead, the same reference numbers will be used for like structures.

The example method 800 disclosed herein starts at block 802 by inserting a first end (e.g., the first portion 402 of FIG. 4) of a fluid connector (e.g., the fluid connector 244 of FIGS. 2A-4) into an opening (e.g., the opening 238 of FIGS. 2B-4) of a fluid passageway (e.g., the fluid passageway 224 of FIGS. 2B, 4, 5B, 6B) of a manifold block (e.g., the manifold block 202 of FIGS. 2A-6B). At block 804, a second end (e.g., the second portion 405 of FIG. 4) of the fluid connector is inserted into an opening (e.g., the opening 242 of FIGS. 2B and 4) of a fluid passageway (e.g., the fluid passageway 226 of FIGS. 2B and 4) of another manifold block (e.g., the manifold block 204 of FIGS. 2A-6B).

At block 806, keyways (e.g., the keyways 228, 232 of FIGS. 2B-4) of the manifold block are aligned with keyways (e.g., the keyways 230, 234 of FIGS. 2B-4) of the other manifold block. Further, a key (e.g., the key 208 of FIGS. 2B-4, 5B, 6B) is inserted into a set of the aligned keyways (e.g., the keyways 228, 230 of FIGS. 2B-4) of the manifold blocks (block 808). At block 810, the example method 800 includes determining whether there is another set of aligned keyways of the aligned manifold blocks. If there is another set of aligned keyways, blocks 808, 810 are repeated. For example, blocks 808, 810 are repeated to insert another key (e.g., the key 510 of FIGS. 2B-4, 5B, 6B) into another set of aligned keyways (e.g., the keyways 232, 234 of FIGS. 2B-4) of the manifold blocks. Blocks 808, 810 are repeated by the example method 800 until no other aligned keyways are identified.

The example method 800 includes identifying whether there is another manifold block to be included in a manifold (e.g., the manifold 200 of FIGS. 2A-4, the manifold 500 of FIGS. 5A-5B, the manifold 600 of FIGS. 6A-6B, the manifold 700 of FIG. 7) (block 812). If there is another manifold block to be included, a first end of another fluid connector (e.g., a first end of a fluid connector substantially similar or identical to the first portion 402 of the fluid connector 244 of FIG. 4) is inserted into an opening (e.g., the opening 520 of FIG. 5B) of a fluid passageway (e.g., the fluid passageway 522 of FIG. 5B) of another manifold block (e.g., the manifold block 502 of FIGS. 5A-5B) (block 814). At block 816, a second end of the other fluid connector (e.g., a second end of the fluid connector substantially similar or identical to the second portion 405 of the fluid connector 244 of FIG. 4) is inserted into another opening (e.g., the opening 512 of FIG. 5B) of the fluid passageway (e.g., the fluid passageway 224 of FIG. 2B, 4, 5B, 6B) of one of the other manifold blocks (e.g., the manifold block 202 of FIGS. 2A-6B). Further, blocks 806, 808, 810, 812 are repeated for the other manifold block of the manifold. Blocks 806, 808, 810, 812, 814, 816 are repeated until no other manifold blocks are identified to be included in the manifold. At block 818, upon identifying the last manifold block of the manifold, a manifold plate (e.g., the manifold plate 218 of FIG. 2A) is coupled to a back side (e.g., the back side 206 of FIGS. 2A-2B) of the manifold (e.g., the manifold 200 of FIGS. 2A-2B). For example, the manifold plate is coupled to the back side of the manifold to enclose and retain the keys in the keyways of the manifold blocks.

Although certain example apparatus have been described herein, the scope of coverage of this patent is not limited thereto. On the contrary, this patent covers all methods, apparatus and articles of manufacture fairly falling within the scope of the amended claims either literally or under doctrine of equivalents.

What is claimed is:

1. An apparatus comprising:
a first manifold block including a first fluid passageway defining a first opening in a first surface of the manifold block, the first manifold block including a first keyway including a stop;
a first key to be inserted in the first keyway and a second keyway of a second manifold block to fluidly couple the first fluid passageway to a second fluid passageway of the second manifold block, the first key to engage the stop when the first key is received within the first keyway to prevent the first key from moving past the stop, the first key and the first and second keyways structured to interact to prevent the first and second fluid passageways from being decoupled when the first key is received within the first and second keyways; and a manifold plate to couple to the first and second manifold blocks to enclose the first key in the first keyway.

2. The apparatus of claim 1, wherein the first fluid passageway is spaced apart from the first keyway, the stop is disposed a first distance from an end of the first manifold block, the first fluid passageway is disposed a second distance from the end, the first distance greater than the second distance.

3. The apparatus of claim 1, wherein the first keyway has a T-shaped cross-section to enable the first key and the first manifold block to interlock to prevent the first manifold block from separating from the second manifold block when the first key is in the first and second keyways, the first key entering the first keyway through an end of the first manifold block that is substantially perpendicular to a surface on which the first fluid passageway is formed, the first keyway extending along the surface.

4. The apparatus of claim 1, wherein the first keyway includes first and second openings including different widths to enable the first key to interlock with the first manifold block to prevent the first manifold block from separating from the second manifold block, the stop being spaced from a centerline of the first manifold block.

5. The apparatus of claim 1, further including a fluid valve that is coupled to the first manifold block and in fluid communication with the first fluid passageway.

6. The apparatus of claim 1, wherein the first manifold block includes a third keyway including a second stop, the second manifold block includes a fourth keyway including a third stop, further including a second key to be inserted in the third keyway and the fourth keyway to couple the first manifold block and the second manifold block.

7. The apparatus of claim 1, wherein the first fluid passageway defines a second opening in a second surface of the first manifold block; and
a third keyway including a second stop extends along the second surface, the third keyway to receive a second key to couple the first manifold block to a third manifold block to fluidly couple the first fluid passageway to a third fluid passageway of the third manifold block, the second key to engage the second stop when the second key is received within the third keyway to prevent the second key from moving past the second stop, the second key and the third keyway structured to interact to prevent the first and third fluid passageways from being decoupled.

8. The apparatus of claim 7, wherein the first fluid passageway defines a third opening in a third surface of the first manifold block and a fourth keyway including a third stop, the fourth keyway extends along the third surface, the fourth keyway to receive a third key to couple the first manifold block to a fourth manifold block to fluidly couple the first fluid passageway to a fourth fluid passageway of the fourth manifold block, the third key to engage the third stop when the third key is received within the fourth keyway to prevent the third key from moving past the third stop, the third key and the fourth keyway structured to interact to prevent the first and fourth fluid passageways from being decoupled when the third key is received within the fourth keyway.

9. An apparatus comprising:
a first manifold block including a first fluid passageway defining a first opening in a first surface of the first manifold block;
a first keyway extending along the first surface, the first keyway including a stop;
a second manifold block including a second fluid passageway defining a second opening in a second surface of the second manifold block;
a second keyway extending along the second surface of the second manifold block;
a first key to be inserted in the first keyway and the second keyway to couple the first manifold block and the second manifold block, the first key to engage the stop when the first key is received within the first keyway to prevent the first key from moving past the stop, the first key and the first and second keyways structured to interact to prevent the first and second fluid passageways from being decoupled when the first key is received within the first and second keyways, the first opening is adjacent the second opening when the first manifold block is coupled to the second manifold block to fluidly couple the first fluid passageway and the second fluid passageway; and
a manifold plate to couple to the first and second manifold blocks to enclose the first key in the first and second keyways.

10. The apparatus of claim 9, wherein the first key includes a first portion received by the first keyway and a second portion received by the second keyway, the first portion being symmetric relative to the second portion, the first and second keyways having a length that is less than a length of the first surface.

11. The apparatus of claim 9, wherein, to prevent the first manifold block and the second manifold block from separating when the first key is in the first keyway and the second keyway, the first and second keyways have T-shaped cross-sections and the first key has an I-shaped cross-section, the stop being disposed a first distance from an end of the first manifold block and the first fluid passageway is a second distance from the end, the first distance greater than the second distance.

12. The apparatus of claim 9, wherein the first manifold block, the second manifold block, and the first key are composed of at least one of stainless steel or brass.

13. The apparatus of claim 9, wherein the first key has a first length that is less than a second length of the first and second keyways to enable the first key to be enclosed in the first and second keyways.

14. The apparatus of claim 9, further including a fluid connector to sealingly couple the first fluid passageway and the second fluid passageway, the first opening includes a first counterbore to receive a first portion of the fluid connector, the second opening includes a second counterbore to receive an opposing second portion of the fluid connector.

15. The apparatus of claim 9, further including:
a third keyway including a second stop, the third keyway extending along the first surface of the first manifold block;
a fourth keyway extending along the second surface of the second manifold block; and
a second key to be inserted in the third keyway and the fourth keyway to further couple the first manifold block and the second manifold block, the second key to engage the second stop when the second key is received within the third keyway to prevent the second key from moving past the second stop, the second key and the third and fourth keyways structured to interact to prevent the first and second fluid passageways from being decoupled when the second key is received within the third and fourth keyways.

16. The apparatus of claim 9, further including:
a third manifold block including a third fluid passageway that defines a third opening in a third surface of the third manifold block and a third keyway including a second stop, the third keyway extends along the third surface; and
a second key inserted in the third keyway of the third manifold block and a fourth keyway extending along a fourth surface of the first manifold block to couple the first manifold block and the third manifold block, the third opening is adjacent a fourth opening of the first fluid passageway defined in the fourth surface of the first manifold block when the first manifold block is coupled to the third manifold block to fluidly couple the first fluid passageway and the third fluid passageway, the second key to engage the second stop when the second key is received within the third and fourth keyways to prevent the second key from moving past the second stop, the second key and the third and fourth keyways structured to interact to prevent the third fluid passageway from decoupling from the first fluid passageway when the second key is received within the third and fourth keyways.

17. The apparatus of claim 16, further including:
a fourth manifold block including a fourth fluid passageway that defines a fifth opening in a fifth surface of the fourth manifold block and a fifth keyway including a third stop, the fifth keyway extends along the fifth surface; and
a third key inserted in the fifth keyway of the fourth manifold block and a sixth keyway extending along a sixth surface of the first manifold block to couple the first manifold block and the fourth manifold block, the fifth opening is adjacent a sixth opening of the first fluid passageway defined in the sixth surface of the first manifold block when the first manifold block is coupled to the fourth manifold block to fluidly couple the first fluid passageway and the fourth fluid passageway, the third key to engage the third stop when the third key is received within the fifth and sixth keyways to prevent the third key from moving past the third stop, the third key and the fifth and sixth keyways structured to interact to prevent the first and fourth fluid passageways from being decoupled when the third key is received within the fifth and sixth keyways.

18. An apparatus comprising:
means for interlocking manifold blocks;
a first manifold block, including:
  a first opening of a first fluid passageway;
  first means for receiving the means for interlocking, the first means for receiving extends along a first surface of the first manifold; and
  means for preventing further movement of the means for interlocking within the first means for receiving;
a second manifold block including a second opening of a second fluid passageway and second means for receiving the means for interlocking, the second means for receiving extends along a second surface of the second manifold block, the means for interlocking to be inserted in the first and second means for receiving to couple the first and second manifold blocks, the first opening adjacent the second opening when the first and second manifold blocks are coupled to fluidly couple the first and second fluid passageways; and
a manifold plate to couple to the first and second manifold blocks to enclose the first and second means for receiving and the first and second means for interlocking.

19. The apparatus of claim 18, wherein the first means for receiving has a tapered or T-shaped cross-section to enable the means for interlocking and the first manifold block to interlock to prevent the first manifold block from separating from the means for interlocking, and the first means for receiving extends a first distance from an end of the first manifold block and the first fluid passageway is a second distance from the end, the first distance greater than the second distance, the first distance being less than a length of the first surface.

20. The apparatus of claim 18, wherein the first means for receiving includes first and second slots having different widths to enable the means for interlocking to interlock with the first manifold block to prevent the first manifold block from separating from the means for interlocking, the first and second slots extending from a first end of the manifold block past a centerline on the first surface without extending to a second end of the first manifold block.

21. The apparatus of claim 18, further including third means for receiving extending along the first surface of the first manifold block and fourth means for receiving extending along the second surface of the second manifold block, the third and fourth means for receiving to receive second means for interlocking to further couple the first manifold block to the second manifold block.

22. The apparatus of claim 18, further including:
a second opening in a second surface of the first manifold block defined by the first fluid passageway;
a third manifold block; and
third means for receiving extending along the second surface, the third means for receiving to receive second means for interlocking to couple the first manifold block to the third manifold block to fluidly couple the first fluid passageway to a third fluid passageway of the third manifold block.

23. The apparatus of claim 22, further including:
a third opening in a third surface of the first manifold block defined by the first fluid passageway;
a fourth manifold block; and
fourth means for receiving to receive third means for interlocking to couple the first manifold block to the fourth manifold block to fluidly couple the first fluid passageway to a fourth fluid passageway of the fourth manifold block.

* * * * *